United States Patent
Kim et al.

(10) Patent No.: US 12,489,228 B2
(45) Date of Patent: Dec. 2, 2025

(54) ANTENNA-SUB HARMONIC MIXER BLOCK AND TERAHERTZ IMAGE SCANNER INCLUDING THE SAME

(71) Applicant: ELECTRONICS AND TELECOMMUNICATIONS RESEARCH INSTITUTE, Daejeon (KR)

(72) Inventors: Young Ho Kim, Daejeon (KR); Kyung Hyun Park, Daejeon (KR); Dong Woo Park, Daejeon (KR); Jun-Hwan Shin, Daejeon (KR); Il Min Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 363 days.

(21) Appl. No.: 18/325,631

(22) Filed: May 30, 2023

(65) Prior Publication Data
US 2024/0063557 A1   Feb. 22, 2024

(30) Foreign Application Priority Data
Aug. 18, 2022   (KR) .......... 10-2022-0103289

(51) Int. Cl.
*G01N 22/00*   (2006.01)
*H01Q 1/48*   (2006.01)
(Continued)

(52) U.S. Cl.
CPC ............. *H01Q 23/00* (2013.01); *G01N 22/00* (2013.01); *H01Q 1/48* (2013.01); *H01Q 9/0407* (2013.01); *H03D 7/02* (2013.01)

(58) Field of Classification Search
None
See application file for complete search history.

(56) References Cited

U.S. PATENT DOCUMENTS 7,616,937 B2   11/2009   Park et al.
2011/0149368 A1   6/2011   Kim et al.
(Continued)

FOREIGN PATENT DOCUMENTS

CN   105207625 A   12/2015
JP   H11-68455 A   3/1999
(Continued)

OTHER PUBLICATIONS

Andreas Schiessel et al., "Rx-Tx Analog Front-End module with 2x96channels for mm-Wave Imaging Systems", 2012 EuMA.
(Continued)

*Primary Examiner* — Idowu O Osifade (57) ABSTRACT

Disclosed is an antenna-sub harmonic mixer block, which includes a dielectric block disposed on a PCB substrate having a ground surface, an antenna including first antenna patch provided on the dielectric block and having a metal patch and a slot, and a second antenna patch provided on the dielectric block, spaced apart from the first antenna patch to surround the first antenna patch, and that receives a ground voltage at the same potential as the ground surface of the PCB substrate, an RF ground wire disposed on the dielectric block and connected from the first antenna patch to a surface having the same potential as the ground surface, an RF switching stage disposed on the dielectric block, connected to the first antenna patch, and that provides a switching ON/OFF operation in conjunction with the RF ground wire depending on a magnitude of a local signal LO.

16 Claims, 7 Drawing Sheets

(51) Int. Cl.
    *H01Q 9/04*     (2006.01)
    *H01Q 23/00*    (2006.01)
    *H03D 7/02*     (2006.01)

(56) References Cited

U.S. PATENT DOCUMENTS

2012/0162747 A1   6/2012  Kim et al.
2014/0154822 A1   6/2014  Park
2019/0190121 A1*  6/2019  Kai .......................... H01Q 9/42

FOREIGN PATENT DOCUMENTS

| KR | 10-2006-0097738 A | 9/2006 |
| KR | 10-2011-0103639 A | 9/2011 |
| KR | 10-2011-0107493 A | 10/2011 |
| KR | 10-1106299 B1 | 1/2012 |
| KR | 10-2012-0065187 A | 6/2012 |
| KR | 10-1385108 B1 | 4/2014 |

OTHER PUBLICATIONS

Yogesh Karandikar et al., "Compact Integration of Sub-Harmonic Resistive Mixer with Differential double Slot Antenna in G-band using 50nm InP-HEMT MMIC Process", 2012 IEEE CSICS.

* cited by examiner

ANTENNA-SUB HARMONIC MIXER BLOCK AND TERAHERTZ IMAGE SCANNER INCLUDING THE SAME

CROSS-REFERENCE TO RELATED APPLICATIONS

This application claims priority under 35 U.S.C. § 119 to Korean Patent Application No. 10-2022-0103289 filed on Aug. 18, 2022, in the Korean Intellectual Property Office, the disclosures of which are incorporated by reference herein in their entireties.

BACKGROUND

Embodiments of the present disclosure described herein relate to a terahertz image scanner, and more particularly, relate to an antenna-sub harmonic mixer block for transmitting or receiving an RF signal and a terahertz image scanner including the same.

With the expansion of mobile devices and the increase in multimedia services, the necessity of broadband short-range wireless communication for innovative next-generation communication is emerging. As the amount of communication increases, the speed of wireless communication is also required. To increase the speed of wireless communication, the carrier frequency should be increased by default. The recent commercial 5G wireless communication has increased the carrier frequency to improve the transmission rate than 4G wireless communication, and the 3.5 GHz and 28 GHz carrier frequency bands were allocated for 5G wireless communication.

The next-generation wireless communication, 6G wireless communication requires higher transmission speed. When 6G wireless communication is introduced, the speed of wireless communication will be flooded with the speed of wired communication. To realize the speed of wireless communication similar to the transmission speed of the wired communication, the wireless communication network should use a carrier frequency of 100 GHz or more. Thus, the wireless network of the Terahertz band may be used to build a 6G wireless communication network.

The terahertz waves refer to an electromagnetic wave having a frequency of 0.1 to 10 THz (1 THz=1012 Hz). The terahertz waves are shorter than millimeter waves, so they have high straightness, beam collective, and high permeability for non-metals or non-frivolous substances than visible light and infrared rays. In addition, since the photon energy of the terahertz wave is only a few MEVs, the use of the terahertz wave is harmless to the human body and the range of use is extensive.

As mentioned above, terahertz electromagnetic waves do not penetrate liquids with polarity such as metals or water, but have a property of partially penetrating various non-metallic materials that are opaque to the naked eye, such as paper, textiles, leather, wood, plastics, and ceramics. In addition, since the wavelength of the terahertz electromagnetic waves is noticeably short, the directivity of electromagnetic radiation is remarkably high, and unlike X-lay, the power is not high, so it is known that it is not harmful to the human body. Accordingly, a lot of research on terahertz electromagnetic waves is being conducted for applied research such as image scanners, which are security devices that can detect whether explosives or dangerous weapons are in possession at airports.

SUMMARY

Embodiments of the present disclosure provide an antenna-sub harmonic mixer block driven with low power and having improved integration.

Embodiments of the present disclosure provide an antenna-sub harmonic mixer block having wideband frequency characteristics.

According to an embodiment of the present disclosure, an antenna-sub harmonic mixer block includes a dielectric block disposed on a PCB substrate having a ground surface, an antenna including first antenna patch provided on the dielectric block and having a metal patch and a slot, and a second antenna patch provided on the dielectric block, spaced apart from the first antenna patch to surround the first antenna patch, and that receives a ground voltage at the same potential as the ground surface of the PCB substrate, an RF ground wire disposed on the dielectric block and connected from the first antenna patch to a surface having the same potential as the ground surface, an RF switching stage disposed on the dielectric block, connected to the first antenna patch, and that provides a switching ON/OFF operation in conjunction with the RF ground wire depending on a magnitude of a local signal LO, an LO filter stage provided on the dielectric block, connected to the RF switching stage, and formed of a metal pattern to filter a signal received through the antenna, a local signal generator connected to the LO filter stage and that generates and provides the local signal LO, an IF filter stage connected to the LO filter stage in parallel with the local signal generator and formed of a metal pattern to filter signals other than a baseband signal IF, and a conductive enclosure that surrounds the dielectric block on the PCB substrate, and in which only an area vertically overlapping with the antenna is open.

According to an embodiment, the metal patch of the first antenna patch and a metal patch of the second antenna patch, which are provided on the dielectric block in the conductive enclosure may be optimized in thickness, length, and spacing between metal slots to form a patch antenna in a broadband, and the patch antenna may be disposed to receive a carrier wave in a terahertz band through the opened area of the conductive enclosure.

According to an embodiment, when viewed from a node of the RF switching stage connected to the first antenna patch, the RF ground wire may be configured to appear as an opened state (high impedance) with respect to a carrier wave (RF) frequency in a terahertz band, and configured to appear as an grounded state (short impedance) with respect to a frequency of the local.

According to an embodiment, the RF switching stage may be configured of a single chip of an anti-parallel pair in which two Schottky barrier diodes are interlocked with each other in parallel with opposite polarities, and configured by bonding in a flip-chip state on the dielectric block.

According to an embodiment, the RF switching stage may provide a switching ON/OFF operation in conjunction with the RF ground wire with respect to the local signal LO generated by the local signal generator and input to the RF switching stage through the LO filter stage, and may be configured to be turned on twice in one period of the local signal LO by switching ON when a strength of the local signal LO is greater than an absolute value of a threshold voltage Vth of the Schottky barrier diode and by switching OFF when the strength of the local signal LO is less than the absolute value of the threshold voltage Vth of the Schottky barrier diode.

According to an embodiment, the LO filter stage and IF filter stage may be configured to have low pass filter characteristics, the LO filter stage may attenuate and filter an RF signal input through the antenna and may pass the local signal LO and the baseband signal IF, and the IF filter stage may pass only the baseband signal IF and may attenuate and filter all other high frequency signals (the RF signal and the local signal LO).

According to an embodiment, the LO filter stage and IF filter stage may form a circuit by configuring a capacitor and inductor with conductive microstrip stub lines.

According to an embodiment, the local signal generator may be composed of a frequency multiplier and amplifier to receive a high-purity reference sine wave signal having a low frequency from the outside and obtain a desired frequency and signal strength.

According to an embodiment of the present disclosure, an image scanner comprising a transmitting cluster, a receiving cluster, and a scanning module, and the receiving cluster includes antenna-sub harmonic mixer blocks in a form of a plurality of arrays disposed on a PCB substrate having the same ground surface and a conductive enclosure surrounding the antenna-sub harmonic mixer blocks, and each of the antenna-sub harmonic mixer blocks includes a dielectric block disposed on the PCB substrate having the ground surface, an antenna including first antenna patch provided on the dielectric block and having a metal patch and a slot, and a second antenna patch provided on the dielectric block, spaced apart from the first antenna patch to surround the first antenna patch, and that receives a ground voltage at the same potential as the ground surface of the PCB substrate, an RF ground wire disposed on the dielectric block and connected from the first antenna patch to a surface having the same potential as the ground surface, an RF switching stage disposed on the dielectric block, connected to the first antenna patch, and that provides a switching ON operation or a switching OFF operation in conjunction with the RF ground wire depending on a magnitude of a local signal LO, an LO filter stage provided on the dielectric block, connected to the RF switching stage, and formed of a metal pattern to filter a signal received through the antenna, a local signal generator connected to the LO filter stage and that generates and provides the local signal LO, an IF filter stage connected to the LO filter stage in parallel with the local signal generator and formed of a metal pattern to filter signals other than a baseband signal, and a conductive enclosure that surrounds the dielectric block on the PCB substrate, and in which only an area vertically overlapping with the antenna is open.

According to an embodiment, the metal patch of the first antenna patch and a metal patch of the second antenna patch, which are provided on the dielectric block in the conductive enclosure may be optimized in thickness, length, and spacing between metal slots to form a patch antenna in a broadband, and the patch antenna may be disposed to receive a carrier wave in a terahertz band through the opened area of the conductive enclosure.

According to an embodiment, when viewed from a node of the RF switching stage connected to the first antenna patch, the RF ground wire may be configured to appear as an opened state (high impedance) with respect to a carrier wave (RF) frequency in a terahertz band, and may be configured to appear as an grounded state (short impedance) with respect to a frequency of the local.

According to an embodiment, the RF switching stage may be configured of a single chip of an anti-parallel pair in which two Schottky barrier diodes are interlocked with each other in parallel with opposite polarities, and configured by bonding in a flip-chip state on the dielectric block.

According to an embodiment, the RF switching stage may provide a switching ON/OFF operation in conjunction with the RF ground wire with respect to the local signal LO generated by the local signal generator and input to the RF switching stage through the LO filter stage, and may be configured to be turned on twice in one period of the local signal LO by switching ON when a strength of the local signal LO is greater than an absolute value of a threshold voltage Vth of the Schottky barrier diode and by switching OFF when the strength of the local signal LO is less than the absolute value of the threshold voltage Vth of the Schottky barrier diode.

According to an embodiment, the LO filter stage and IF filter stage may be configured to have low pass filter characteristics, the LO filter stage may attenuate and filter an RF signal input through the antenna and may pass the local signal LO and the baseband signal IF, and the IF filter stage may pass only the baseband signal IF and may attenuate and filter all other high frequency signals (the RF signal and the local signal LO).

According to an embodiment, the LO filter stage and IF filter stage may form a circuit by configuring a capacitor and inductor with conductive microstrip stub lines.

According to an embodiment, the local signal generator may be composed of a frequency multiplier and amplifier to receive a high-purity reference sine wave signal having a low frequency from the outside and to obtain a desired frequency and signal strength.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter embodiments of the present disclosure may be described in detail and clearly to such an extent that an ordinary one in the art easily implements the present disclosure.

The terms used in the specification are provided to describe the embodiments, not to limit the present disclosure. In the present specification, the singular form also includes the plural form unless otherwise specified in the phrase. The terms "comprises" and/or "comprising," when used in the specification, specify the presence of steps, operations, elements, and/or components, but do not preclude the presence or addition of one or more other steps, operations, elements, components, and/or groups thereof.

Unless otherwise defined, all terms (including technical and scientific terms) used in the specification should have the same meaning as commonly understood by those skilled in the art to which the present disclosure pertains. In addition, terms defined in the commonly used dictionary are not interpreted ideally or excessively unless explicitly defined specifically. In the present specification, the same reference numerals may refer to the same components throughout the entire text.

Figure 1:
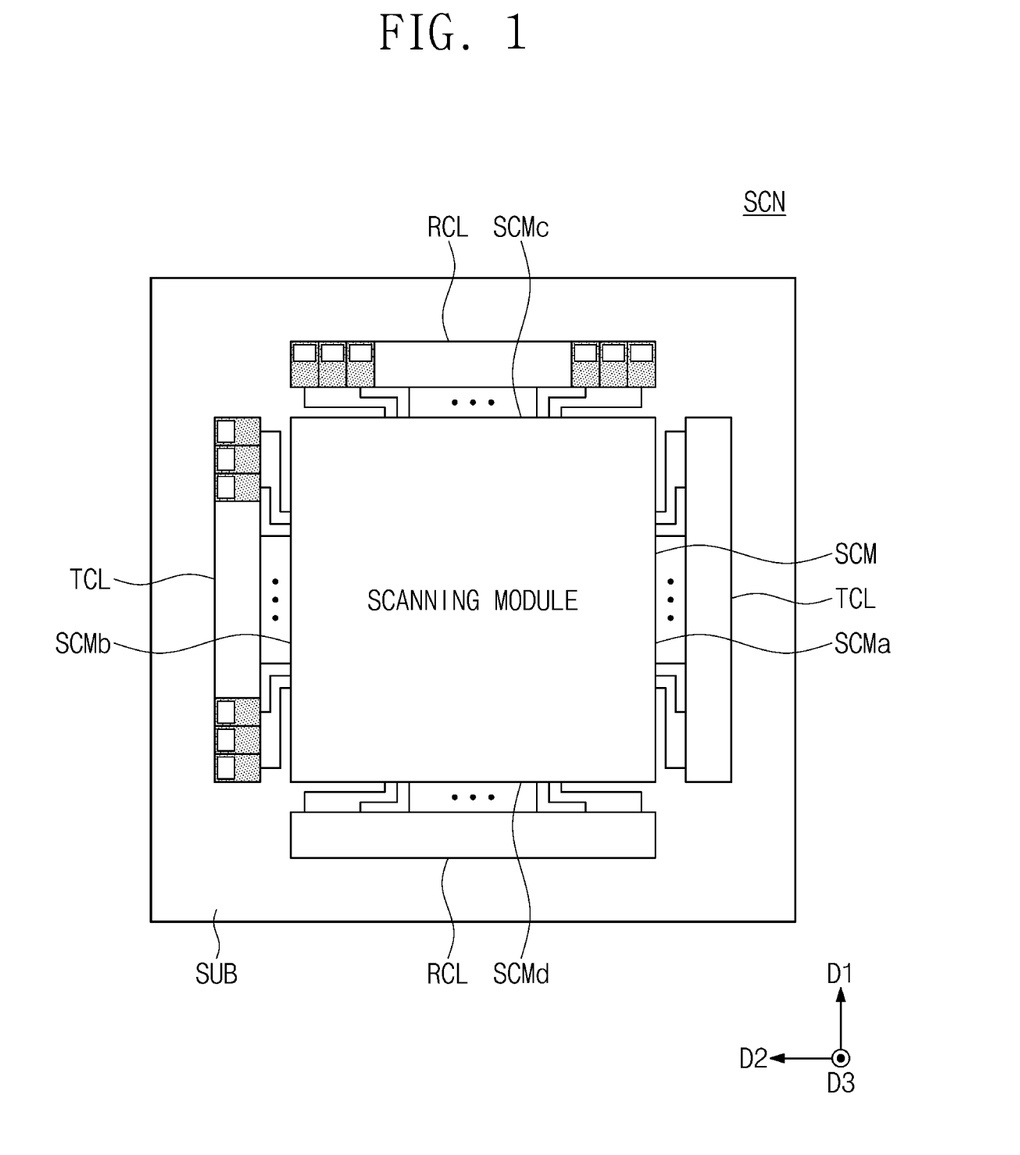
FIG. 1 is a diagram illustrating an embodiment of an image scanner including an antenna-sub harmonic mixer block according to the present disclosure.
Figure 2:
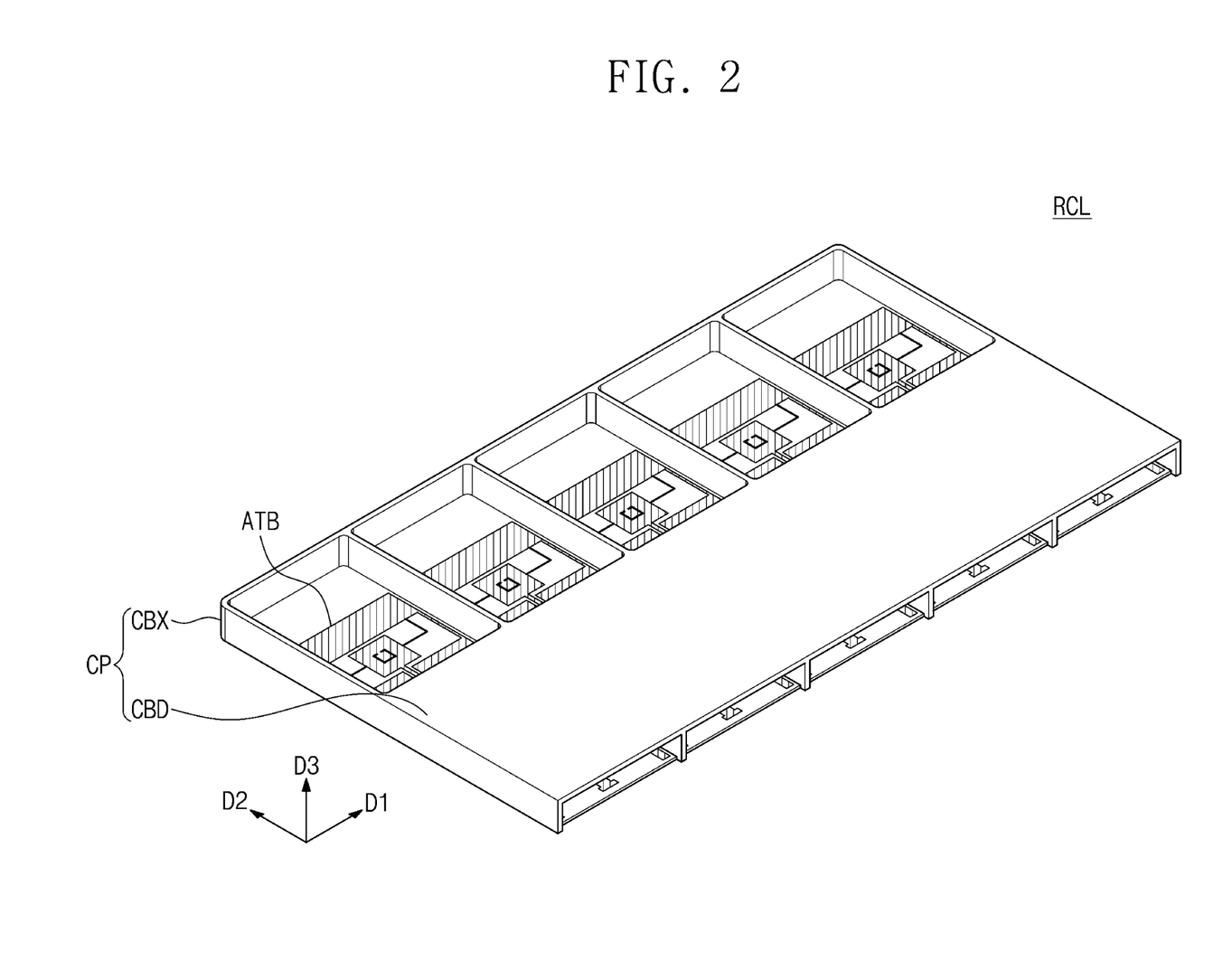
FIG. 2 is an enlarged view of a transmitting cluster of FIG. 1.
Figure 3:
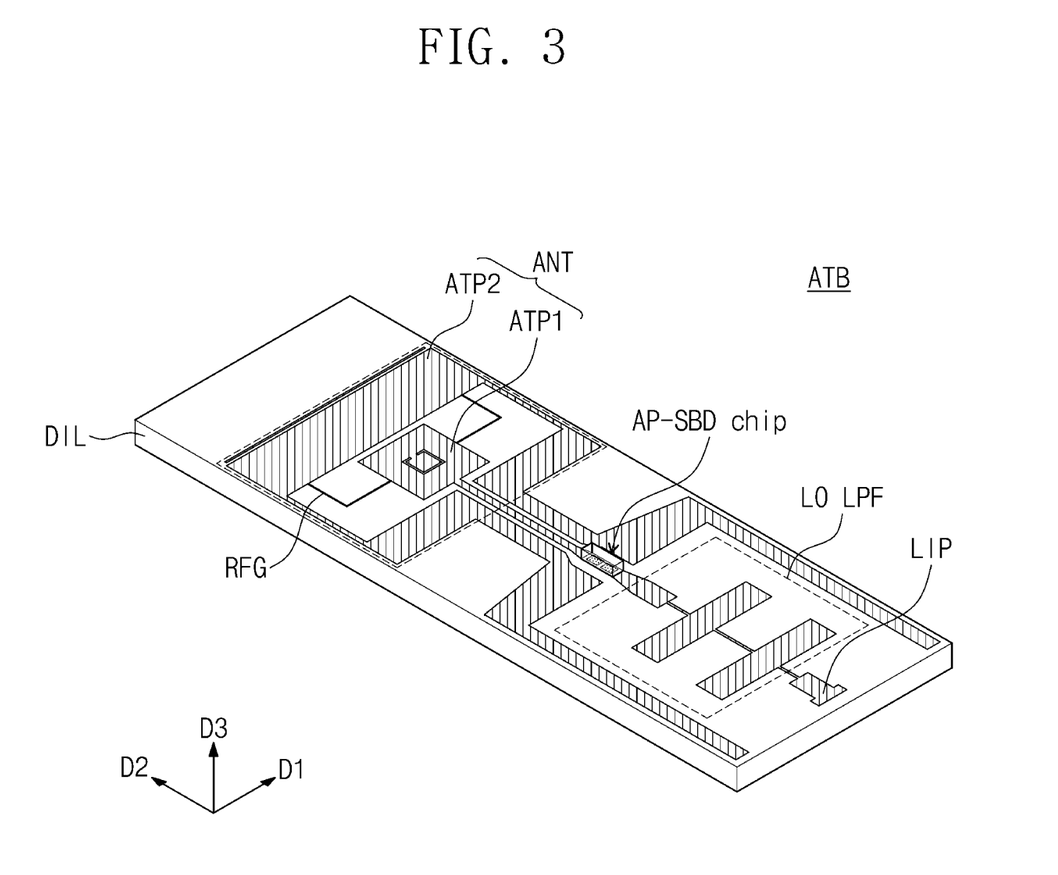
FIG. 3 is an enlarged view of an antenna-sub harmonic mixer block of FIG. 2.
Figure 4:
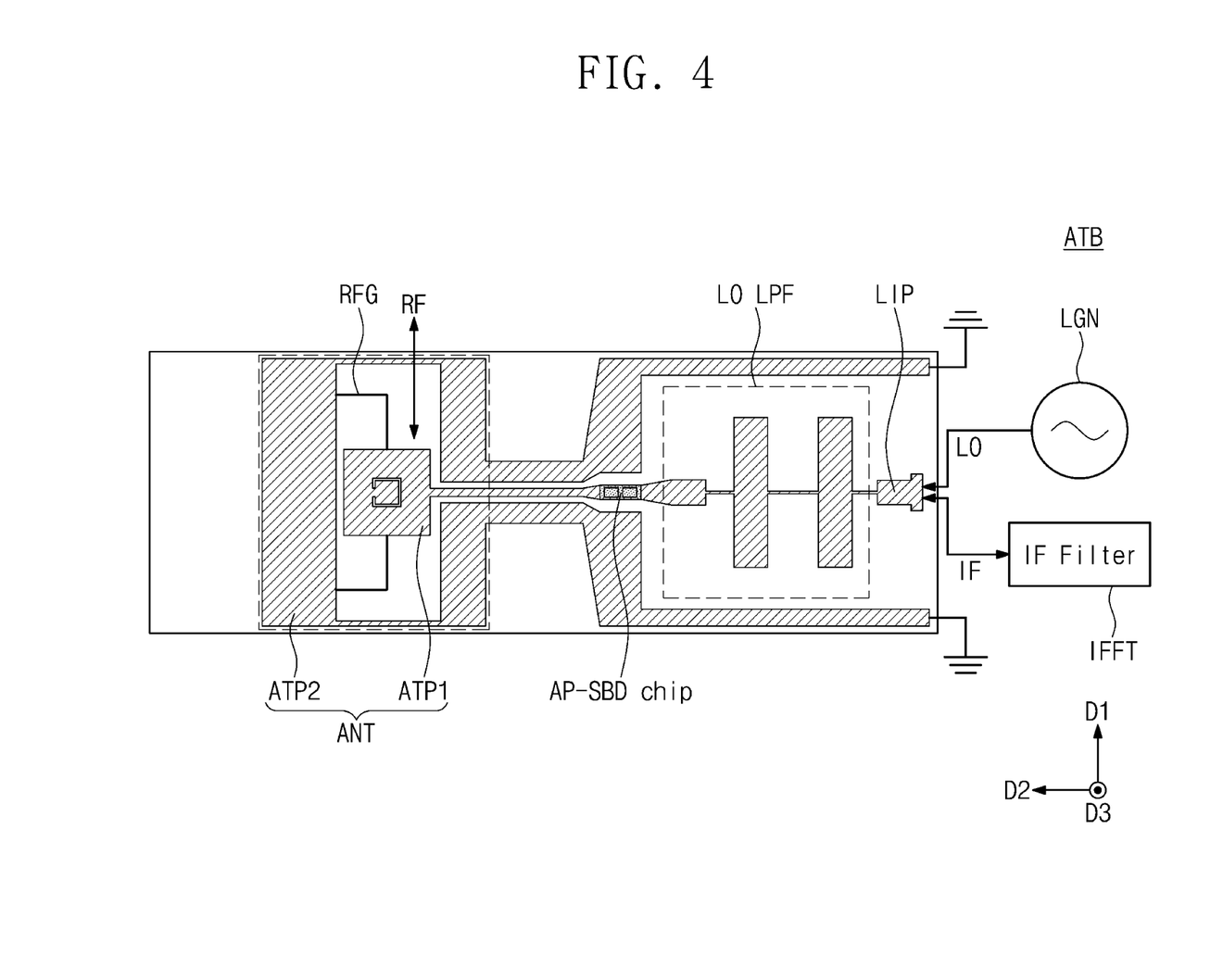
FIG. 4 is a top plan view of an antenna-sub harmonic mixer block of FIG. 3.
Figure 5:
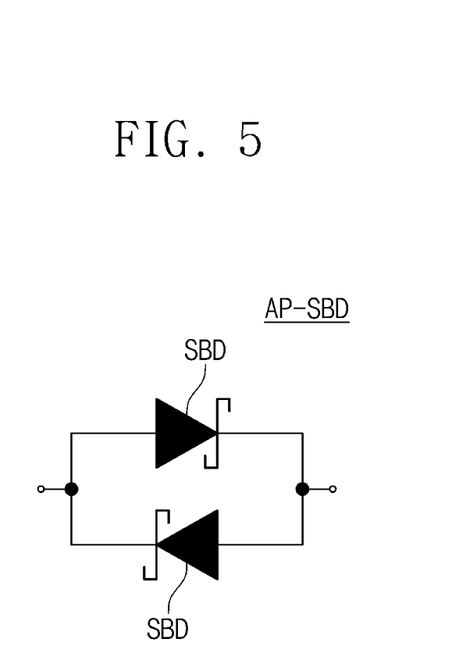
FIG. 5 is a circuit diagram illustrating a sub harmonic mixer of FIG. 4.

FIG. 1 is a diagram illustrating an embodiment of an image scanner including an antenna-sub harmonic mixer block according to the present disclosure. FIG. 2 is an enlarged view of a transmitting cluster of FIG. 1. FIG. 3 is an enlarged view of an antenna-sub harmonic mixer block of FIG. 2. FIG. 4 is a top plan view of an antenna-sub harmonic mixer block of FIG. 3. FIG. 5 is a circuit diagram illustrating a sub harmonic mixer of FIG. 4. Hereinafter, an embodiment of an antenna-sub harmonic mixer block ATB and an image scanner SCN including the antenna-sub harmonic mixer block ATB according to the present disclosure will be described in detail with reference to FIGS. 1 to 5.

Referring to FIG. 1, the image scanner SCN according to the present disclosure may include a scanning module SCM and transmitting and receiving clusters (TCL and RCL). The scanning module SCM and the transmitting and receiving clusters (TCL and RCL) may be provided on a substrate PCB. The transmitting and receiving clusters (TCL and RCL) may include the transmitting cluster TCL and the receiving cluster RCL. The substrate PCB may include, for example, a PCB substrate including a ground surface.

The transmitting cluster TCL may be configured to receive a local signal LO and a baseband signal IF from the scanning module SCM and to output a transmission wave. The baseband signal IF may include information to be transmitted through the transmission wave.

The transmitting cluster TCL may generate the transmission wave by mixing the local signal LO and the baseband signal IF. The transmission wave may have a frequency in a terahertz band. The transmitting cluster TCL may output the transmission wave and may radiate it to free space.

Referring to FIG. 2, the transmitting cluster TCL may include a plurality of antenna-sub harmonic mixer blocks ATB. The plurality of antenna-sub harmonic mixer blocks ATB forming the transmitting cluster TCL may be arranged in an array form in a first direction D1. The plurality of antenna-sub harmonic mixer blocks ATB may be spaced apart by a conductive enclosure CP.

Each antenna-sub harmonic mixer block ATB may receive the local signal LO and the baseband signal IF from the scanning module SCM and may output the transmission wave RF. The detail configuration and operation of the antenna-sub harmonic mixer block ATB will be described later with reference to FIGS. 2 to 5.

Referring back to FIG. 1, the receiving cluster RCL may be configured to receive the local signal LO from the scanning module SCM, to receive a received signal (carrier wave RF) from the outside of the image scanner SCN, and to output the baseband signal IF to the scanning module SCM. The received signal RF may have a frequency in the terahertz band.

The received signal RF is reflected signals (i.e., carrier waves) while the transmission wave RF output from the transmitting cluster TCL passes through an object outside the image scanner SCN. The baseband signal IF may include information to be obtained from the received signal. For example, the baseband signal IF may include information corresponding to characteristics of an external object through which the received signal RF is transmitted.

The receiving cluster RCL may include a plurality of antenna-sub harmonic mixer blocks ATB. The plurality of antenna-sub harmonic mixer blocks ATB forming the receiving cluster RCL may be arranged in a second direction D2. The second direction D2 may be orthogonal to the first direction D1.

Each antenna-sub harmonic mixer block ATB may be configured to receive the local signal LO and the received signal RF and to output the baseband signal IF to the scanning module SCM. The plurality of antenna-sub harmonic mixer blocks ATB constituting the receiving cluster RCL may have actually the same configuration as the antenna-sub harmonic mixer blocks ATB and the conductive enclosure CP constituting the transmitting cluster TCL.

The transmitting cluster TCL and the receiving cluster RCL may be arranged to surround the scanning module SCM. For example, the transmitting cluster TCL may be disposed to be spaced apart from a first side SCMa and a second side SCMb of the scanning module SCM. The first side SCMa and the second side SCMb of the scanning module SCM may be side surfaces extending in the first direction D1, respectively. For example, the receiving cluster RCL may be disposed to be spaced apart from a third side SCMc and a fourth side SCMd of the scanning module SCM. The third side SCMc and the fourth side SCMd of the scanning module SCM may be side surfaces extending in the second direction D2, respectively.

The scanning module SCM may be configured to process information included in the baseband signal IF received from the receiving cluster RCL. The scanning module SCM may be configured to perform an image scanning operation based on the baseband signal IF output to the transmitting cluster TCL and the baseband signal IF received from the receiving cluster RCL. The scanning module SCM may generate image data of an external object through which a received signal passes through based on the received baseband signal IF. The image data generated by the scanning module SCM may be implemented on a display. The display may be included inside the image scanner SCN or may be provided separately from the image scanner SCN.

Hereinafter, with reference to FIGS. 3 to 5, the antenna-sub harmonic mixer blocks ATB included in the receiving cluster RCL will be described in detail as a representative.

Referring to FIGS. 3 and 4, the antenna-sub harmonic mixer block ATB may include a dielectric block DIL, the conductive enclosure CP, an antenna ANT, an RF switching stage AP-SBD, and an LO filter stage LO LPF.

The dielectric block DIL may have a rectangular parallelepiped shape. The dielectric block DIL may include a dielectric material. The dielectric material may include, for example, quartz. The antenna ANT, an RF ground wire RFG, the RF switching stage AP-SBD, and the LO filter stage LO LPF may be provided on an upper surface of the dielectric block DIL. The antenna ANT, the RF ground wire RFG, the RF switching stage AP-SBD, and the LO filter stage LO LPF may include a conductive material. The conductive material may include, for example, titanium, tantalum, tungsten, copper, or aluminum. In general, gold, which has low resistance and high conductivity, is mainly used as the conductive material.

The conductive enclosure CP may include a conductive box CBX surrounding the dielectric block DIL and a conductive plate CBD covering a portion of an upper portion of the dielectric block DIL. The conductive enclosure CP may be provided to open only an area vertically overlapping with the antenna ANT on the dielectric block DIL on the substrate PCB and to cover other areas. The conductive enclosure CP may be configured to optimize a thickness, length, and spacing of slots of the metal patches of the first and second antenna patches, which will be described later, and thus, the antenna may include a broadband patch antenna for transmitting and receiving broadband signals.

Accordingly, the conductive enclosure CP may block unnecessary external radio waves into the antenna-sub harmonic mixer block ATB by using electromagnetic shielding, and may improve inter-channel isolation characteristics in association with a filter.

The receiving cluster RCL of the antenna ANT may be configured to receive signals from the outside. The antenna ANT may include a first antenna patch ATP1 and a second antenna patch ATP2.

The first antenna patch ATP1 may be provided on an upper surface of the dielectric block DIL. The first antenna patch ATP1 may include a thin and flat metal patch and a slot. The shape of the metal patch in the first antenna patch ATP1 may be designed such that its impedance matches that of a material existing outside the cluster. For example, the metal patch may have a square shape. However, it is not limited thereto, and the size and shape of the first antenna patch ATP1 may be determined depending on the frequency of the transmission wave output from the transmitting cluster TCL, impedance matching in the receiving cluster RCL, and a mode of the received signal.

The second antenna patch ATP2 may be provided on an upper surface of the dielectric block DIL. The second antenna patch ATP2 may be disposed to be spaced apart from the first antenna patch ATP1. The second antenna patch ATP2 may surround the sides of the first antenna patch ATP1 to widen a bandwidth that the antenna can process. The second antenna patch ATP2 is connected to and grounded on the substrate PCB (refer to FIG. 1), and a ground voltage with the same potential as that of the ground surface on the substrate is applied to the second antenna patch ATP2.

The RF switching stage AP-SBD may be disposed on the dielectric block DIL and connected to the first antenna patch ATP1, and may be configured to perform a switching ON operation or a switching OFF operation in conjunction with the RF ground wire according to the magnitude of the local signal. For example, when a potential difference between the ground potential applied to the RF ground wire and the local signal is greater than a threshold voltage, the RF switching stage AP-SBD may be configured to be a switching ON, and the potential difference between the ground potential applied to the RF ground wire and the local signal is less than the threshold voltage, the RF switching stage AP-SBD may be configured to be a switching OFF. The RF switching stage AP-SBD may mix received signals to generate a signal having a frequency corresponding to a sum or difference of frequencies. The baseband signal IF may be generated by mixing the received RF signal and the local signal LO by the RF switching stage AP-SBD having a nonlinear characteristic.

For example, the RF switching stage AP-SBD may include a Schottky barrier diode connected in anti-balance (refer to FIG. 5). In other words, the RF switching stage may be configured as a single chip of an anti-parallel pair in which two Schottky barrier diodes are interlocked with opposite polarities in parallel. The two Schottky barrier diodes composed of a pair of a single chip in the RF switching stage may be bonded and disposed on a dielectric block in a flip-chip state. The Schottky barrier diode may be turned on at about 0.56V and current can flow, and the voltage at this time is called a threshold voltage. The threshold voltage is determined by a semiconductor material of the PN junction.

When the magnitude of a swing of the local signal LO received at the RF switching stage AP-SBD is greater than the threshold voltage Vth, the anti-balanced Schottky diode is turned on, and when the magnitude of the swing of the local signal LO received at the RF switching stage AP-SBD is less than the threshold voltage Vth, the anti-balanced Schottky diode is turned off. In detail, since the RF switching stage is composed of a single chip of an anti-parallel pair in which two Schottky barrier diodes are interlocked with each other in parallel with opposite polarities, turned-on operation is performed twice in one period of the local signal LO.

In order for the anti-balanced Schottky diode of the sub harmonic mixer to maintain a switching operation, a steady DC voltage, that is, an RF ground voltage, should be provided to the node opposite to the anti-balanced Schottky diode to which the local signal LO is transferred. To solve this problem, the RF ground wire RFG is provided. When viewed from the node of the RF switching stage connected to the first antenna patch ATP1, the RF ground wire RFG is configured to have an open characteristic having a very high impedance in the frequency domain of the carrier wave (or received RF signal) input through the antenna, and is configured to have a short characteristic having a low impedance in the frequency domain of the local signal LO. In detail, the RF ground wire RFG operates in an open state with respect to the carrier wave such that the first antenna patch ATP1 receives the carrier wave and transfers the RF signal to the RF switching stage AP-SBD, and the RF ground wire RFG has a ground-level impedance with respect to the local signal LO such that the anti-balanced Schottky diode performs stable switching operation with respect to the local signal LO having a magnitude greater than a turn-on voltage at the RF switching stage AP-SBD.

The LO filter stage LO LPF is serially connected to the RF switching stage AP-SBD and a local signal generator LGN and may be configured to pass both the local signal LO and the baseband signal IF. The local signal LO passes through the LO filter stage LO LPF, is input to the RF switching stage, and is mixed with the RF (carrier wave) signal input through the antenna. Of these, the baseband signal IF is output through the LO filter stage LO LPF.

The LO filter stage LO LPF may include conductive microstrip stub lines. For example, the LO filter stage LO LPF may include a metal pattern composed of a conductive microstrip stub line and operating as a capacitor, and a metal pattern composed of a conductive microstrip stub line and operating as an inductor.

Referring back to FIG. 4, a signal input/output port LIP may be connected to the LO filter stage LO LPF. The signal input/output port LIP may receive the local signal generated by the local signal generator LGN.

The local signal generator LGN may include a frequency multiplier and an amplifier. The local signal generator LGN may be configured to receive a high-purity reference signal from the outside, to amplify the frequency with a frequency multiplier, and to amplify the signal strength with an amplifier.

The local signal generator LGN may be included in the antenna-sub harmonic mixer block, but is not limited thereto, and may be configured to be disposed outside the antenna-sub harmonic mixer block to transfer the local signal.

In the case of the receiving cluster, the signal input/output port LIP may output the baseband signal IF from the LO filter stage. In the case of the receiving cluster, the baseband signal may be a signal filtered in an LO filter stage after a carrier wave RF received from an antenna is mixed.

A component of the local signal LO and a component of the baseband signal IF may exist together in the signal input/output port LIP.

The local signal generator LGN and the IF filter stage IFFT may be connected in parallel to the signal input/output port LIP. The local signal generator LGN and the IF filter stage IFFT may be provided outside the dielectric block, but may be provided on the dielectric block, unlike illustrated in the drawing. The IF filter stage IFFT may include a metal pattern or a circuit component configured to filter signals other than the baseband signal.

The IF filter stage IFFT may be connected to the signal input/output port LIP to filter only components corresponding to the baseband signal IF. In detail, the IF filter stage IFFT may be configured to filter the baseband signal and not pass signals having higher frequencies (e.g., the local signal) than the baseband signal.

Both the LO filter stage and the IF filter stage may operate as a low pass filter or a band pass filter. The LO filter stage may pass the local signal and the baseband signal, and may attenuate and filter other signals. For example, the LO filter stage may attenuate and filter a signal received through the antenna and may pass the local signal and the baseband signal.

Figure 6:
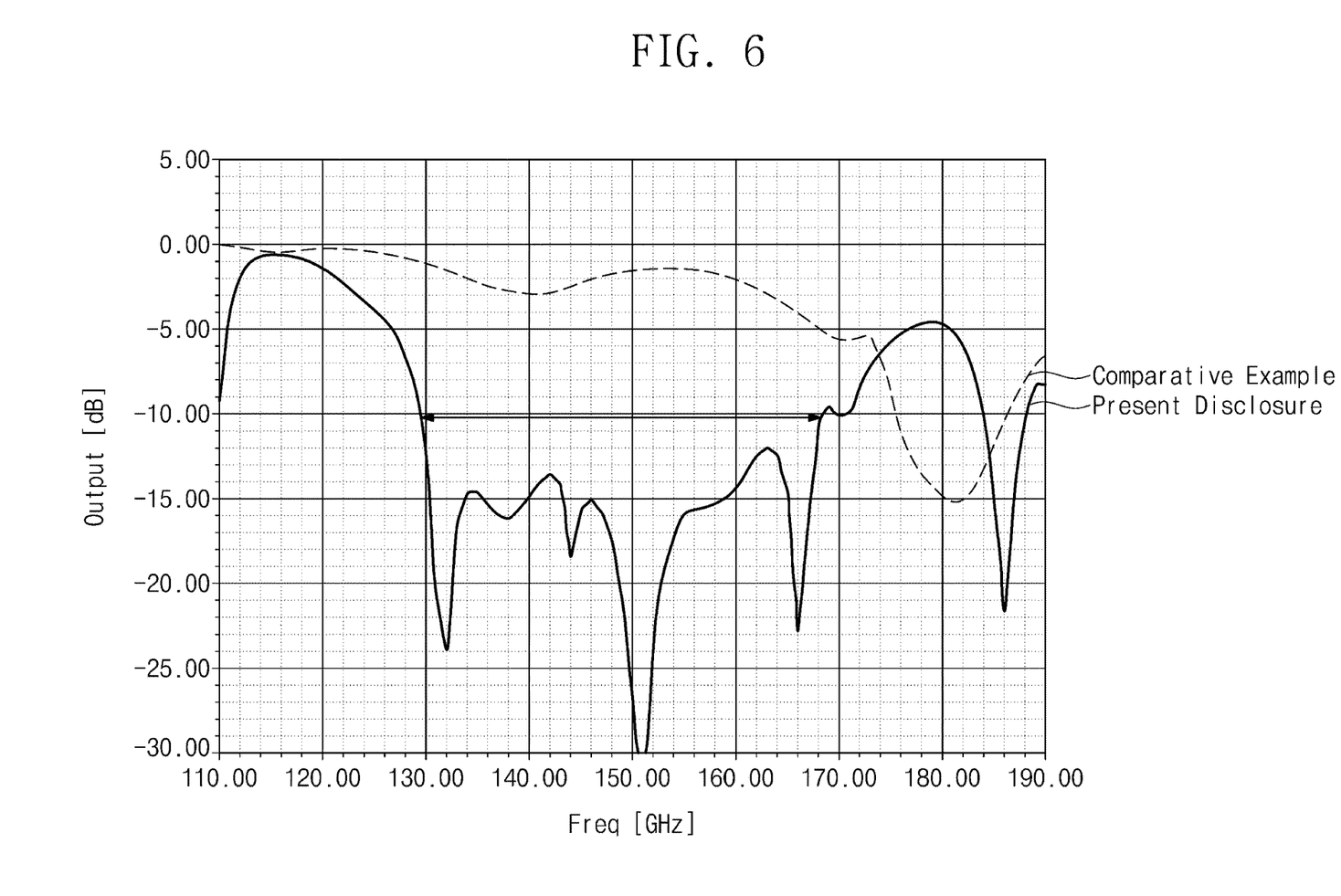
FIG. 6 is a graph illustrating bandwidths of a comparative example and the present disclosure.

FIG. 6 is a graph illustrating bandwidths of a comparative example and the present disclosure.

Referring to FIG. 6, it may be seen that the present disclosure has a wider band than the comparative example representing the first antenna patch as long as the bandwidth (e.g., the bandwidth with an output of −10 dB or less) available for transmission and reception does not provide the second antenna patch.

Figure 7:
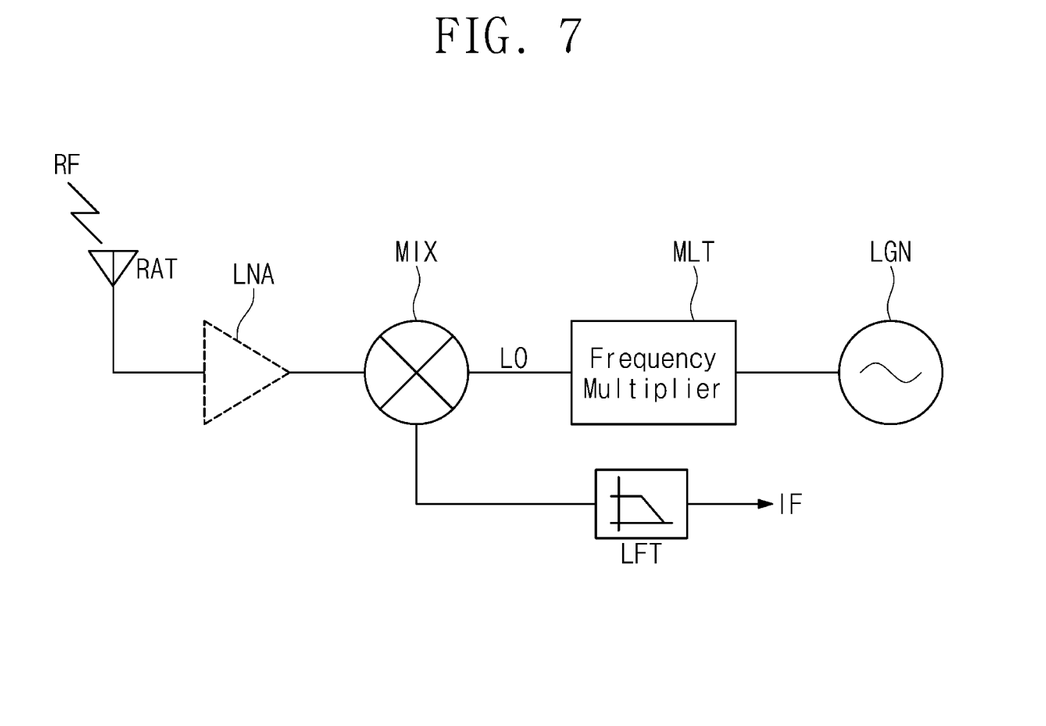
FIG. 7 is a schematic circuit diagram of a comparative example for describing effects of the present disclosure.
Figure 8:
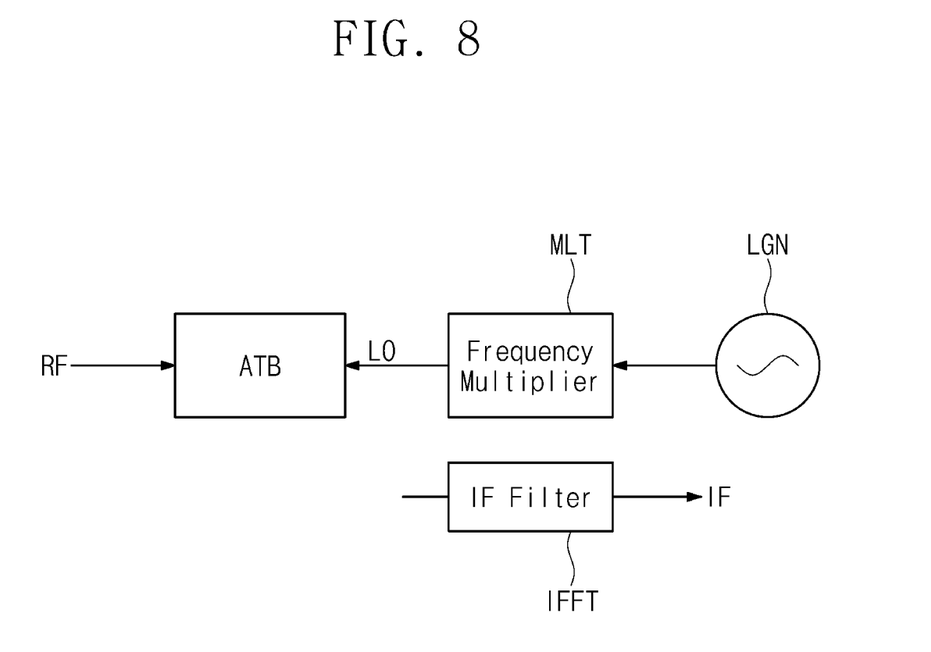
FIG. 8 is a schematic circuit diagram using an antenna-sub harmonic mixer block of the present disclosure.

FIG. 7 is a schematic circuit diagram of a comparative example for describing effects of the present disclosure. FIG. 8 is a schematic circuit diagram using an antenna-sub harmonic mixer block of the present disclosure. Hereinafter, effects of the present disclosure will be described with reference to FIGS. 7 to 8.

Referring to FIG. 7, a comparative example may include a receiving antenna RAT for receiving an RF signal, a signal amplifier LNA for amplifying the received signal, a receiving mixer MIX, a frequency multiplier MLT, the local oscillator LGN, and a low pass filter LFT.

In the comparative example, the frequency multiplier MLT may multiply the signal oscillated by the local oscillator LGN and may provide the local signal LO to the receiving mixer MIX. The signal amplifier LNA may amplify the signal received through the receiving antenna RAT and may provide the amplified signal to the receiving mixer MIX. The receiving mixer MIX may generate the baseband signal IF by mixing signals received from the signal amplifier LNA and the frequency multiplier MLT. The baseband signal IF may be filtered to have only low-pass component frequencies through the low pass filter LFT.

In the case of the comparative example, the signal amplifier LNA is an active element and consumes power in the process of amplifying a signal. In addition, as the signal amplifier LNA is disposed between the receiving antenna RAT and the receiving mixer MIX, the length of the line between the receiving antenna RAT and the receiving mixer MIX may be increased, and circuit complexity may increase.

In contrast, referring to FIG. 8, in the case of the present disclosure, the antenna-sub harmonic mixer block ATB according to the present disclosure may be provided by replacing the receiving antenna RAT, the signal amplifier LNA, and the receiving mixer MIX.

In the present disclosure, an antenna, a sub harmonic mixer, and an LO filter stage included in the antenna-sub harmonic mixer block ATB may all be passive elements. Accordingly, in the case of the present disclosure, power consumption may be reduced compared to the comparative example including the active elements.

In addition, in the antenna-sub harmonic mixer block of the present disclosure, as described above, since the antenna patch and the sub harmonic mixer are directly connected, the line between the antenna and the mixer may be shortened, resulting in integration. Accordingly, in the case of the present disclosure, the signal-to-noise ratio may be improved and the power loss in the line may be reduced compared to the comparative example.

In an embodiment according to the present disclosure, the RF ground wire RFG may be provided between the first antenna patch ATP1 and the second antenna patch ATP2. In the case of the present disclosure, a wider band antenna characteristic may be obtained when provided with the second antenna patch ATP2 than when only the first antenna patch ATP1 is provided.

In this specification, the local signal LO is a terahertz carrier frequency and may be a signal generated by multiplying and amplifying a pure local oscillation signal from the outside.

In this specification, the sub-harmonic mixer in the receiving cluster may mix the local signal LO multiplied in the local oscillation signal and the carrier wave (RF) to generate the baseband signal IF having a low-pass frequency corresponding to a difference between a double frequency ($2*f\_LO$) of the local signal and a frequency ($f\_RF$) of the carrier wave. The frequency of the baseband signal IF is expressed in Equation 1 below.

$$f_{IF}=|2*f_{LO}-f_{RF}| \quad \text{[Equation 1]}$$

When the anti-balanced Schottky diode is turned on two times during one period of the local signal LO, depending on the mechanism by which the RF signal is transferred, a mixing operation is performed at a node between the anti-balanced Schottky diode and the LO filter stage. Through this, primarily, |2*fLO−fRF| and |2*fLO+fRF| mixing frequency signals and a number of harmonics are generated.

The LO filter stage (refer to FIG. 4) may cancel the received RF signal, which is in the frequency domain greater than the local signal LO, as well as |2*fLO+fRF| mixing frequency signal and a plurality of high-order harmonic signals through suppression operation, and may pass the local signal LO and |2*fLO−fRF| frequency of the mixed baseband signal IF, which is in the frequency domain less than the local signal LO.

Since the local signal LO component and the generated baseband signal IF component coexist in the signals after the LO filter stage, a baseband filter is additionally placed on the path line through the via on the substrate, and thus, the signal may be processed by extracting only pure baseband signal components. In this case, a conversion loss, which is a performance index of the sub harmonic mixer, is expressed in Equation 2 below.

$$L_e=|P_{IF}(\text{dBm})-P_{RF}(\text{dBm})-L_{line}(\text{dB})| \quad \text{[Equation 2]}$$

Here, P_IF is an output power of the baseband signal of the mixer, P_RF is power of the received signal received by the antenna, and L_line is power loss occurring in the transmission line.

According to an embodiment of the present disclosure, an antenna-sub harmonic mixer block with improved integration and low power capable of driving in a terahertz band is provided.

According to an embodiment of the present disclosure, a broadband antenna providing an RF ground wire for sub harmonic mixer operation while having a wider bandwidth than conventional structures is provided. In addition, an antenna-sub harmonic mixer block in which the broadband antenna is embedded in a sub harmonic mixer block to reduce line loss and minimize the size of components is provided.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments, but should be defined by the claims described below as well as the claims and equivalents of the present disclosure.

What is claimed is:

1. An antenna-sub harmonic mixer block comprising:
a dielectric block disposed on a PCB substrate having a ground surface;
an antenna including a first antenna patch provided on the dielectric block and having a metal patch and a slot, and a second antenna patch provided on the dielectric block, spaced apart from the first antenna patch to surround the first antenna patch, and configured to receive a ground voltage at the same potential as the ground surface of the PCB substrate;
an RF ground wire disposed on the dielectric block and connected to the first antenna patch having the same potential as the ground surface;
an RF switching stage disposed on the dielectric block, connected to the first antenna patch, and configured to provide a switching ON/OFF operation in conjunction with the RF ground wire depending on a magnitude of a local signal LO;
an LO filter stage provided on the dielectric block, connected to the RF switching stage, and formed of a metal pattern to filter a signal received through the antenna;
a local signal generator connected to the LO filter stage and configured to generate and provide the local signal LO;
an IF filter stage connected to the LO filter stage in parallel with the local signal generator and formed of a metal pattern to filter signals other than a baseband signal IF; and
a conductive enclosure configured to surround the dielectric block on the PCB substrate, and in which only an area vertically overlapping with the antenna is open.

2. The antenna-sub harmonic mixer block of claim 1, wherein the metal patch of the first antenna patch and a metal patch of the second antenna patch, which are provided on the dielectric block in the conductive enclosure are optimized in thickness, length, and spacing between metal slots to form a patch antenna in a broadband, and the patch antenna is disposed to receive a carrier wave in a terahertz band through the opened area of the conductive enclosure.

3. The antenna-sub harmonic mixer block of claim 1, wherein, when viewed from a node of the RF switching stage connected to the first antenna patch, the RF ground wire is configured to appear as an opened state (high impedance) with respect to a carrier wave (RF) frequency in a terahertz band, and configured to appear as an grounded state (short impedance) with respect to a frequency of the local signal LO.

4. The antenna-sub harmonic mixer block of claim 1, wherein the RF switching stage is configured of a single chip of an anti-parallel pair in which two Schottky barrier diodes are interlocked with each other in parallel with opposite polarities, and configured by bonding in a flip-chip state on the dielectric block.

5. The antenna-sub harmonic mixer block of claim 4, wherein the RF switching stage is:
configured to provide a switching ON/OFF operation in conjunction with the RF ground wire with respect to the local signal LO generated by the local signal generator and input to the RF switching stage through the LO filter stage, and
configured to be turned on twice in one period of the local signal LO by switching ON when a strength of the local signal LO is greater than an absolute value of a threshold voltage Vth of the Schottky barrier diode and by switching OFF when the strength of the local signal LO is less than the absolute value of the threshold voltage Vth of the Schottky barrier diode.

6. The antenna-sub harmonic mixer block of claim 1, wherein the LO filter stage and IF filter stage are configured to have low pass filter characteristics,
wherein the LO filter stage attenuates and filters an RF signal input through the antenna and passes the local signal LO and the baseband signal IF, and
wherein the IF filter stage passes only the baseband signal IF and attenuates and filters all other high frequency signals (the RF signal and the local signal LO).

7. The antenna-sub harmonic mixer block of claim 6, wherein the LO filter stage and IF filter stage form a circuit by configuring a capacitor and inductor with conductive microstrip stub lines.

8. The antenna-sub harmonic mixer block of claim 1, wherein the local signal generator is composed of a frequency multiplier and amplifier to receive a high-purity reference sine wave signal having a low frequency from the outside and to obtain a desired frequency and signal strength.

9. An image scanner comprising a transmitting cluster, a receiving cluster, and a scanning module, and
wherein the receiving cluster includes antenna-sub harmonic mixer blocks in a form of a plurality of arrays disposed on a PCB substrate having the same ground surface and a conductive enclosure surrounding the antenna-sub harmonic mixer blocks, and
wherein each of the antenna-sub harmonic mixer blocks includes:
a dielectric block disposed on the PCB substrate having the ground surface;
an antenna including a first antenna patch provided on the dielectric block and having a metal patch and a slot, and a second antenna patch provided on the dielectric block, spaced apart from the first antenna patch to surround the first antenna patch, and configured to receive a ground voltage at the same potential as the ground surface of the PCB substrate;

an RF ground wire disposed on the dielectric block and connected from the first antenna patch to a surface having the same potential as the ground surface;

an RF switching stage disposed on the dielectric block, connected to the first antenna patch, and configured to provide a switching ON operation or a switching OFF operation in conjunction with the RF ground wire depending on a magnitude of a local signal LO;

an LO filter stage provided on the dielectric block, connected to the RF switching stage, and formed of a metal pattern to filter a signal received through the antenna;

a local signal generator connected to the LO filter stage and configured to generate and provide the local signal LO; and an IF filter stage connected to the LO filter stage in parallel with the local signal generator and formed of a metal pattern to filter signals other than a baseband signal; and wherein the conductive enclosure configured to surround the dielectric block on the PCB substrate, and in which only an area vertically overlapping with the antenna is open.

10. The image scanner of claim 9, wherein the metal patch of the first antenna patch and a metal patch of the second antenna patch, which are provided on the dielectric block in the conductive enclosure are optimized in thickness, length, and spacing between metal slots to form a patch antenna in a broadband, and the patch antenna is disposed to receive a carrier wave in a terahertz band through the opened area of the conductive enclosure.

11. The image scanner of claim 9, wherein, when viewed from a node of the RF switching stage connected to the first antenna patch, the RF ground wire is configured to appear as an opened state (high impedance) with respect to a carrier wave (RF) frequency in a terahertz band, and configured to appear as a grounded state (short impedance) with respect to a frequency of the local signal LO.

12. The image scanner of claim 9, wherein the RF switching stage is configured of a single chip of an antiparallel pair in which two Schottky barrier diodes are interlocked with each other in parallel with opposite polarities, and configured by bonding in a flip-chip state on the dielectric block.

13. The antenna-sub harmonic mixer block of claim 12, wherein the RF switching stage is:

configured to provide a switching ON/OFF operation in conjunction with the RF ground wire with respect to the local signal LO generated by the local signal generator and input to the RF switching stage through the LO filter stage; and configured to be turned on twice in one period of the local signal LO by switching ON when a strength of the local signal LO is greater than an absolute value of a threshold voltage Vth of the Schottky barrier diode and by switching OFF when the strength of the local signal LO is less than the absolute value of the threshold voltage Vth of the Schottky barrier diode.

14. The image scanner of claim 9, wherein the LO filter stage and IF filter stage are configured to have low pass filter characteristics, wherein the LO filter stage attenuates and filters an RF signal input through the antenna and passes the local signal LO and the baseband signal IF, and wherein the IF filter stage passes only the baseband signal IF and attenuates and filters all other high frequency signals (the RF signal and the local signal LO).

15. The image scanner of claim 14, wherein the LO filter stage and IF filter stage form a circuit by configuring a capacitor and inductor with conductive microstrip stub lines.

16. The image scanner of claim 9, wherein the local signal generator is composed of a frequency multiplier and amplifier to receive a high-purity reference sine wave signal having a low frequency from the outside and obtain a desired frequency and signal strength.

* * * * *